(12) United States Patent
Hecklinger

(10) Patent No.: US 7,113,853 B2
(45) Date of Patent: Sep. 26, 2006

(54) SYSTEM AND METHOD FOR GENERATING VEHICLE HISTORY INFORMATION

(75) Inventor: John M. Hecklinger, Washington, DC (US)

(73) Assignee: Carfax, Inc., Fairfax, VA (US)

( * ) Notice: Subject to any disclaimer, the term of this patent is extended or adjusted under 35 U.S.C. 154(b) by 0 days.

(21) Appl. No.: 10/619,541

(22) Filed: Jul. 16, 2003

(65) Prior Publication Data

US 2006/0178793 A1 Aug. 10, 2006

(51) Int. Cl.
*G06F 7/00* (2006.01)

(52) U.S. Cl. .......................... 701/35; 701/29; 701/208; 342/357.13

(58) Field of Classification Search .................. 701/29, 701/30, 32, 35, 208, 212; 342/357.13
See application file for complete search history.

(56) References Cited

U.S. PATENT DOCUMENTS

| | | | |
|---|---|---|---|
| 4,989,144 A | | 1/1991 | Barnett et al. |
| 5,127,005 A | | 6/1992 | Oda et al. |
| 5,598,511 A | | 1/1997 | Petrinjak et al. |
| 5,794,164 A | * | 8/1998 | Beckert et al. ............ 455/3.06 |
| 5,899,985 A | | 5/1999 | Tanaka |
| 5,917,405 A | * | 6/1999 | Joao ...................... 340/426.17 |
| 5,999,878 A | * | 12/1999 | Hanson et al. .............. 701/208 |
| 6,026,345 A | * | 2/2000 | Shah et al. .................. 701/117 |
| 6,052,631 A | | 4/2000 | Busch et al. |
| 6,098,061 A | | 8/2000 | Gotoh et al. |
| 6,240,365 B1 | * | 5/2001 | Bunn ......................... 701/213 |
| 6,259,354 B1 | | 7/2001 | Underwood et al. |
| 6,397,131 B1 | | 5/2002 | Busch et al. |
| 6,476,715 B1 | * | 11/2002 | Bromer ...................... 340/468 |
| 6,505,106 B1 | * | 1/2003 | Lawrence et al. ............ 701/35 |
| 2002/0016655 A1 | * | 2/2002 | Joao ............................ 701/35 |
| 2002/0194051 A1 | | 12/2002 | Hall et al. |

OTHER PUBLICATIONS www.autocheck.com, "AutoCheck Vehicle History Reports: Free VIN Check," p. 1 of 1, date printed Jul. 14, 2004.
www.autocheck.com, "Welcome to AutoCheck," pp. 1 of 4, date printed Jul. 12, 2004.
www.autocheck.com, "Sample Reports," An AutoCheck Clean Bill of Health: 2G1WL54T4L9101564, 1990 Chevy Lumina, pp. 1 of 3, date printed Jul. 12, 2004.

(Continued)

*Primary Examiner*—Gertrude A. Jeanglaude
(74) *Attorney, Agent, or Firm*—Nixon Peabody LLP; Tim L. Brackett, Jr.; Daniel S. Song

(57) ABSTRACT

A system, method and computer readable storage medium for generating vehicle history information are provided which, based on vehicle history records, determine whether a particular vehicle has a reliability issue and/or has passed import inspection. The reliability issue portion accesses a central database of vehicle history records for particular vehicles and a reliability issue data supplier look-up table to determine whether a reliability issue exists, and then displays the reliability issue or a file indicating that no reliability issue exists. The reliability issue may relate to a recall status of the vehicle and/or to the existence of a manufacturer buyback. The import compliance, or gray market, portion accesses the central database records to determine whether title/registration records in different countries exist along with an import record. Depending on the conclusions reached, the system and method displays an appropriate advisory record.

38 Claims, 10 Drawing Sheets

OTHER PUBLICATIONS www-odi.nhtsa.dot.gov, "Office of Defects Investigation," p. 1 of 1, date printed Jul. 14, 2004.
www-odi.nhtsa.dot.gov, "Office of Defects Investigation, Cars/Problems/Recalls," pp. 1 of 2, date printed Jul. 14, 2004.
www.carfax.com, "Don't buy a used car without CARFAX!", p. 1 of 1, date printed Nov. 8, 2004.
www.carfax.com, "CARFAX Vehicle History Report", pp. 1-9, date printed Nov. 8, 2004.

* cited by examiner

VIN Check

Please enter the VIN you want a CARFAX Report for, so it can be validated before your order is processed.

VIN: [            ] —103    Secure Application

A VIN must be exactly 17 characters long; the letters "I","O", or "Q" never appear.

Our credit card processing, secured by Verisign, allows us to provide you with immediate access your CARFAX Report. Our secure server encrypts your private information to protect your transaction.

No risk - instant money back guarantee!

[ Continue My Order ]—105

Get every penny back if not 100% satisfied!

Benefits of CARFAX Reports:
- Get the real history for only $14.99
- 100% Money-back Guarantee
- On-screen results in seconds

Report Summary      Register your Guarantee  Run Another Report  Print Report

GOOD NEWS - CARFAX Certified History - Guaranteed!
This 1999 MITSUBISHI GALANT ES (4A3AA46G1XE001357) qualifies for the CARFAX Certified History, a guarantee worth up to $5,000 that protects you from buying a vehicle with severe damage, mileage fraud, or Lemon history.

1. ACCIDENT CHECK
   Total Loss Check            (OK) No Severe Accidents Reported to DMV- GUARANTEED!
   Other Accident Indicators   (OK) No Accidents Indicators Reported
2. MILEAGE ACCURACY CHECK
   Truth-In-Mileage Check      (OK) No Odometer Problems Reported to DMV- GUARANTEED!
   Odometer Rollback Check     (OK) No Odometer Rollback Detected
3. MANUFACTURER BUYBACK       (OK) No Lemon Law Vehicle Reported to DMV- GUARANTEED!
                               (FYI) Manufacturer Buyback Reported by Mitsubishi
4. OWNERSHIP CHECK
   Number of Owners            (FYI) 3 Estimated Owner(s)
   Type of Owners              (FYI) Originally Registered as a Private Vehicle
5. RECALL CHECK                (FYI) 1 Open Recall(s) Reported DETAILED VEHICLE HISTORY: 5 HISTORY RECORDS REPORTED- Add to this vehicle's history 107  CARFAX does not inspect vehicles. This vehicle may have problems that have not been reported to CARFAX. A vehicle inspection is recommended. How CARFAX analyzed this vehicle's history.

[5] RECALL CHECK　　　　　　　　　　　　　　Run Another Report　Print Report (FYI) This 1999 MITSUBISHI GALANT ES (4A3AA46G1XE001357) has 1 manufacturer recall(s) that require repair. Most manufacturer recalls can be repaired at no cost to you.

| Date: | Source: | Description: | ─115 |
|---|---|---|---|
| 05/29/2003 | Mitsubishi Motors | on Lamp Switch<br>on Steering Gear<br>on Transmission Equipment | |

Mitsubishi Motors provides data to CARFAX to help ensure that all Mitsubishi vehicles consistently meet manufacturer specifications. This vehicle is eligible for free repairs Call 1-888-648-7820 to find an authorized Mitsubishi dealer and schedule service at no cost.

Recall Check FAQs:
How CARFAX Customers use this section | Sources of recall data | CARFAX recalls vs NHTSA recalls

*FIG. 6*

DETAILED VEHICLE HISTORY　　　　　　　　　Run Another Report　Print Report

CARFAX searched over 2.16 billion records from nearly 800 sources and found 6 record(s) for this 1999 MITSUBISHI GALANT ES (4A3AA46G1XE001357).

| Date: | Odometer Reading: | Source: | General Comments: |
|---|---|---|---|
| 08/11/1998 | 59 | Virginia<br>Motor Vehicle Dept.<br>Bristol, VA | Title or registration issued<br>First owner reported |
| 08/11/1998 | | Virginia<br>Motor Vehicle Dept.<br>Bristol, VA | Registered as<br>private vehicle　　─119 |
| 12/04/1998 | 1,783 | Mitsubishi Motors | Mitsubishi Repurchased this vehicle<br>from its original owner due to:<br><br>Body Water Leaks<br>Body Seam Rust<br>Hesitation/Stalling<br><br>For more information call Mitsubishi<br>at 1-888-648-7820 |
| 08/07/2002 | 71,050 | Tennessee<br>Motor Vehicle Dept.<br>Johnson City, TN | Title or registration issued<br>New owner reported<br>Loan or lien reported<br>Title #65334552 |
| 07/10/2003 | | Mitsubishi Motors | Manufacturer recall issued　─117<br>on Lamp Switch<br>on Steering Gear<br>on Transmission Equipment<br><br>You can find a local Mitsubishi dealer to perform this free repair by going to the Mitsubishi Retailer locator at<br>http://www.mitsubishicars.com/retailers/index.html<br>or by calling 1-888-648-7820 |

*FIG. 7*

Report Summary     Register your Guarantee 🗐 Run Another Report 🗐 Print Report 🖨

GOOD NEWS - CARFAX Certified History - Guaranteed!
This 1999 MITSUBISHI GALANT ES (4A3AA46G4XE082094) qualifies for the CARFAX Certified History, a guarantee worth up to $5,000 that protects you from buying a vehicle with severe damage, mileage fraud, or Lemon history.

1. ACCIDENT CHECK
    Total Loss Check     (OK) No Severe Accidents Reported to DMV- GUARANTEED!
    Other Accident Indicators     (FYI) Accident Indicators Reported 2. MILEAGE ACCURACY CHECK
    Truth-In-Mileage Check     (OK) No Odometer Problems Reported to DMV- GUARANTEED!
    Odometer Rollback Check     (OK) No Odometer Rollback Detected     ⟵ 121

3. MANUFACTURER BUYBACK     (OK) No Manufacturer Buyback Reported to DMV- GUARANTEED!
    (OK) No Manufacturer Buyback Ever Reported by Mitsubishi 4. OWNERSHIP CHECK
    Number of Owners     (FYI) 2 Estimated Owner(s)
    Type of Owners     (FYI) Originally Registered as a Rental Vehicle 5. RECALL CHECK     (FYI) No Open Recall(s) Reported DETAILED VEHICLE HISTORY: 10 HISTORY RECORDS REPORTED- Add to this vehicle's history 109 ⟶ CARFAX does not inspect vehicles. This vehicle may have problems that have not been reported to CARFAX. A vehicle inspection is recommended. How CARFAX analyzed this vehicle's history.

[5] RECALL CHECK     Run Another Report 🗐 Print Report 🖨

(FYI) This 1999 MITSUBISHI GALANT ES (4A3AA46G4XE082094) has no recall(s) that still require repair.

Date:     Source:     Description:     ⟵ 111
06/02/2003     Mitsubishi Motors     No recalls open for repair Recall Check FAQs:
How CARFAX Customers use this section | Sources of recall data | CARFAX recalls vs NHTSA recalls

*FIG. 9*

DETAILED VEHICLE HISTORY          Run Another Report 🗐  Print Report 🖨

CARFAX searched over 2.16 billion records from over 4,000 different public and private sources and found 10 record(s) for this 1999 MITSUBISHI GALANT ES (4A3AA46G4XE082094).

| Date: | Odometer Reading: | Source: | General Comments: |
|---|---|---|---|
| 05/06/1999 | | Vermont<br>Motor Vehicle Dept.<br>Tulsa, OK | Registered as<br>rental vehicle<br>(major car rental company) |
| 05/07/1999 | 5 | Vermont<br>Motor Vehicle Dept.<br>Tulsa, OK<br>Title #0507991301018 | Title issued<br>First owner reported<br>Loan lien reported |
| 06/14/2000 | 28,226 | Auto Auction | Sold at auction<br>in Eastern Region<br>Listed as a<br>fleet vehicle |
| 07/17/2000 | 28,237 | New York<br>Inspection Station<br>New York City Area | Passed safety inspection |
| 07/18/2000 | | Service Plan Co.<br>Brooklyn, NY | Service Contract Issued |
| 07/20/2000 | 28,375 | Inspection Co.<br>New York | Vehicle Inspected |
| 09/15/2000 | | New York<br>Motor Vehicle Dept.<br>Brooklyn, NY | Title issued<br>New owner reported<br>Loan or lien reported |
| 11/30/2000 | | New York<br>Police Report<br>Case #0-484156 | Accident Reported<br>in New York County<br>Vehicle involved in crash<br>with another motor vehicle |
| 07/15/2003 | | Mitsubishi Motors | No recalls open for repair    —114 |
| 07/15/2003 | | Mitsubishi Motors | Vehicle never repurchased by<br>manufacturer |

FIG. 10

DETAILED VEHICLE HISTORY

CARFAX searched over 2.16 billion records from over 4,000 different public and private sources and found 7 record(s) for this 2000 ACURA 3.2 TL (19UUA5664YA804655).

| Date: | Odometer Reading: | Source: | General Comments: |
|---|---|---|---|
| 05/14/2001 | | Ontario Ministry of Transportaion Central Ontario | First owner reported |
| 06/01/2001 | 11,181 | Indiana Motor Vehicle Dept. Indianapolis, IN Title #01081659009 | Title issued New owner reported<br><br>CARFAX Advisor: This vehicle may not have been properly imported. As a result, it may not comply with US safety and emission standards, the odometer may not reflect accurate mileage after being converted to mile. You should confirm this vehicle was inspected when it entered the US.<br><br>Also, manufacturers do not always honor Original Warranty on imported vehicles. Check with your manufacturer. |
| 06/13/2001 | 18,024 | Pennsylvania Motor Vehicle Dept. Pittsburgh, PA Title #56216694VE01 | Title issued New owner reported |
| 06/13/2001 | | Auto Auction | Sold at auction in Eastern Region Listed as a dealer vehicle |

DETAILED VEHICLE HISTORY

CARFAX searched over 2.16 billion records from over 4,000 different public and private sources and found 7 record(s) for this 2000 ACURA 3.2 TL (19UUA5664YA804655).

| Date: | Odometer Reading: | Source: | General Comments: |
|---|---|---|---|
| 05/14/2001 | | Ontario Ministry of Transportaion Central Ontario | First owner reported |
| 05/19/2001 | | US Dept of Transportation Buffalo, NY | Vehicle imported to United States |
| 05/25/2001 | | US Dept of Transportation Buffalo, NY | Vehicle inspected and complies with US highway safety standards |
| | | | CARFAX Advisor: Some manufacturers do not honor the original warranty on imported vehicles. Check with your dealer or manufacturer to be sure. |
| 06/01/2001 | 11,181 | Indiana Motor Vehicle Dept. Indianapolis, IN Title #01081659009 | Title issued New owner reported |
| 06/13/2001 | 18,024 | Pennsylvania Motor Vehicle Dept. Pittsburgh, PA Title #56216694VE01 | Title issued New owner reported |
| 06/13/2001 | | Auto Auction | Sold at auction in Eastern Region Listed as a dealer vehicle |

SYSTEM AND METHOD FOR GENERATING VEHICLE HISTORY INFORMATION

TECHNICAL FIELD

This invention relates to a system and method for generating information related to the history of a vehicle and, in particular, to a system and method for determining whether a particular vehicle has reliability issues and/or has passed import inspection.

BACKGROUND OF THE INVENTION

The automotive industry is perhaps one of the largest industries in many industrialized regions of the world. As a result, the market for used vehicles has evolved into a substantial market, especially in North America, and in particular, the United States and Canada.

Those parties involved in the trading of used vehicles recognize the importance of information relating to a used vehicle's history in making a purchasing decision including placing a value on the particular vehicle. Consequently, services have been created that function primarily to provide vehicle history information to various parties in the used vehicle market, including dealers and individual consumers. For example, Carfax, Inc., the assignee of the present application, provides a variety of vehicle history information to both buyers and sellers of vehicles. In particular, Carfax offers a web site at www.carfax.com permitting a potential buyer of a vehicle to purchase a vehicle history report containing an extensive collection of information on a particular vehicle. For example, the vehicle history report includes such vehicle history information as model year, odometer readings, ownership records, accident information, the existence of salvage and/or flood titles and maintenance records.

Buyers of used vehicles are often especially concerned about the vehicle meeting fundamental manufacturer warranties and governmental safety standards. It is well known that some used vehicles may contain defects resulting from the design and/or manufacture of the vehicle. Many recalls are initiated solely by vehicle manufacturers to correct defects unrelated to safety while safety-related recalls may be mandated by a government agency. New car dealerships have access to manufacturer recall information, including safety recalls and other recalls, provided by the manufacturer(s) of the vehicles offered for sale by the dealership. Buyers can obtain recall information on their particular vehicle by visiting the local dealership offering the make and model of particular vehicle and requesting recall data. Regarding safety recalls, in the United States, the National Highway and Traffic Safety Administration (NHTSA) requires all vehicle manufacturers to follow a safety recall process to ensure the owners of recalled vehicles are officially notified of the potential defect and provided an opportunity to have the defect repaired free of charge. Also, a list of vehicle year, make and models subject to a safety recall is published and available to repair shops and used car dealers at http://www-odi.nhtsa.dot.gov/cars/problems/recalls/. Buyers of used vehicles can determine whether a general category of vehicle, i.e. year, make and model, has been recalled for safety reasons by accessing the NHTSA web site and entering the year, make and model of the vehicle. The NHTSA web site does not indicate the recall status of a particular vehicle.

Consumers also desire to avoid vehicles having a history of major problems, for example, not remedied to the satisfaction of the previous owner. Many states have enacted Lemon Laws to provide consumers an effective way of dealing with new vehicles having substantial problems which the manufacturer has not been successful in correcting. Although the specific requirements of Lemon Laws vary from state to state, most Lemon Laws require a manufacturer to offer to repurchase, or buy back, the vehicle from the first owner when the problems have not been fixed within a reasonable number of attempts, or after a specific amount of time. Many, but not all, states having Lemon Laws require the vehicle title to be marked or branded with some indication that the vehicle is a "lemon", or a manufacturer buyback, vehicle. Carfax presently acquires titling data from state titling agencies, e.g., Dept. of Motor Vehicles, and provides an indication to a user of their system regarding the existence of a manufacturer buyback when a title of a particular vehicle indicates such. Occasionally, manufacturers buy back vehicles as a courtesy to unsatisfied customers when a vehicle has problems but is not covered by the Lemon Laws. However, these courtesy buybacks are not always recorded on the vehicle title. Carfax only reports manufacturer buybacks indicated on the vehicle title and provided by a few state agencies, and therefore a system for reporting substantially all buybacks has not been achieved heretofore.

Most people shopping for a used car would also appreciate the value in knowing whether a used car they are considering buying, if previously imported into their country, meets their government's safety requirements. For example, in the United States, American consumers sometimes purchase bargain-priced vehicles that were not intended originally for sale in the U.S. marketplace. The U.S. Department of Transportation (DOT) and the Environmental Protection Agency (EPA) requires each imported vehicle to pass an import inspection ensuring the vehicle meets all U.S. safety and emissions requirements. In Canada, Transportation Canada handles import inspection and enforcement, with the additional requirement of running lights. Imported vehicles without an import inspection, often referred to as "grey market" vehicles, can result in unexpected disadvantages to the buyer. In many cases, the disadvantages may outweigh the cost savings. For example, in the U.S., the grey market vehicle may not comply with federal safety and emissions standards thus requiring costly adjustments or alterations prior to being used legally within the U.S. In addition, grey market goods may not be covered by the manufacturer's warranty. If a grey market vehicle is defective, the manufacturer may not be willing or even required to rectify the problem.

Experian provides a web site at www.autocheck.com that provides reports with information on a vehicle's history, including an indication of whether a grey market record was located for the particular vehicle of interest. The grey market vehicle is defined as one which entered the country and did not meet U.S. safety and/or environmental standards. The Carfax web site, www.carfax.com, also indicates, based on information relating to the particular vehicle, whether the vehicle was previously registered or titled outside of the U.S. and may not comply with U.S. safety and emissions standards. However, this conclusion by Carfax is based limited information provided by only a few states. Specifically, when a consumer attempts to title or register a vehicle in a state, the state will request an import compliance document, often referred to as a release bond, from the consumer. If the consumer provides the release bond, then the state allows registration, whereas if the consumer does not provide the bond, then the state indicates the vehicle as a grey market vehicle. However many states do not make this compliance information available.

SUMMARY OF THE INVENTION

It is, therefore, one object of the present invention to overcome the deficiencies of the prior art by providing a system and method capable of efficiently and effectively determining whether a particular vehicle is subject to an open recall and/or has passed import inspection.

Another object of the present invention is to provide a system and method for more effectively determining, generating and displaying certain important historical information to dealers and individual consumers regarding used vehicles.

Yet another object of the present invention is to provide a system and method for generating vehicle history information which is more informative and useful to a potential buyer of a used vehicle.

A still further object of the present invention is to provide a system and method for generating vehicle history information which displays more specific information about the vehicle in a more meaningful and informative manner.

Yet another object of the present invention is to provide a system and method for supplying important vehicle history information to consumers to allow a more informed, educated decision regarding the value and/or purchase of a used vehicle.

Still another object of the present invention is to provide a system and method for generating vehicle history information which effectively and simply determines whether a particular vehicle, instead of just a category, e.g. make, model and year, of vehicles is subject to a recall or whether no open recalls exist for the particular vehicle.

A still further object of the present invention is to provide a system and method which simply and effectively determines whether a vehicle is a gray market vehicle, i.e. has passed import inspection and effectively communicates the determination to the consumer along with other import-influenced vehicle information, such as warranty coverage information.

The above objects, and other objects, are achieved by providing a method for generating and displaying information relating to a vehicle's history, comprising the steps of identifying records in a database that relate to a particular vehicle, said records containing data relating to the vehicle's history and determining whether the records include a reliability issue record containing information indicating that a reliability issue exists for the particular vehicle. If a reliability issue record exists for the particular vehicle, then the method will display an electronically displayable reliability issue file, whereas if no reliability issue record exists, then it is determined whether the database should contain reliability issue information regarding the particular vehicle. If the database should include reliability issue information, an electronically displayable file related to the absence of a reliability issue for the particular vehicle is displayed.

The step of determining whether the database should contain reliability issue information may include determining whether a manufacturer of the vehicle provides data for inclusion in the database. The step of determining whether the manufacturer of the vehicle provides data for inclusion in said database may include accessing a look-up table listing vehicle manufacturers providing data for inclusion in the database and determining whether the manufacturer of the vehicle is listed in the look-up table.

The reliability issue record may be an open recall record and/or a manufacturer buyback record. The file related to the absence of a reliability issue may include a no open recall file indicating that no recalls are open for repair, whereas the reliability issue file may include an open recall file including a name of the manufacturer of the particular vehicle and a description of vehicle components recalled. The reliability issue file may be displayed chronologically based on an effective date of the recall in a chronological listing of vehicle history records associated with the particular vehicle. The method may further including the steps of providing an electronically displayable file having an input field for receiving a vehicle identification number associated with the particular vehicle. The step of identifying records may be based on the particular vehicle identification number.

The present invention is also directed to a method for generating and displaying import compliance information relating to a vehicle's history, comprising the steps of determining whether a first title/registration record of the records relating to the particular vehicle indicate the vehicle originated in a first country; determining whether a second title/registration record, subsequent to the first title/registration record during the vehicle's history, indicates at least one of a titling and a registration in a second country; determining whether an import record exists that indicates compliance with import standards of the second country at a time during the history of the vehicle after the first title/registration record; and, if no import record relating to the second country exists after the first title/registration record, then displaying an electronically displayable first import advisory file related to the vehicle not meeting import standards of the second country.

The first import advisory file may further indicate that the vehicle may not be covered by a manufacturer's warranty. The first import advisory file may be displayed in a chronological listing of vehicle history records for the particular vehicle and may be displayed chronologically immediately subsequent to said second title/registration records. The method may further include the step of displaying an electronically displayable second import advisory record indicating the vehicle meets import standards of the second country, if an import record relating to the second country exists after the first title/registration record.

In another embodiment of the invention, the above method steps are performed by a computer implemented system having various units for executing the steps. The steps may be in the form of executable instructions on a computer readable medium.

BRIEF DESCRIPTION OF THE DRAWINGS

FIG. 4 is a user interface display of an electronically displayable file showing an initial entry page with an VIN input field;

FIG. 5 is a user interface display of an electronically displayable file showing a report summary with a recall check portion indicating an open recall and a manufacturer buyback portion;

FIG. 6 is a user interface display of an electronically displayable file showing a recall check section;

FIG. 7 is a user interface display of an electronically displayable file showing a detailed history report with recall and buyback details;

FIG. 8 is a user interface display of an electronically displayable file similar to FIG. 5 but indicating no open recalls and no manufacturer buyback;

FIG. 9 is a user interface display of an electronically displayable file similar to FIG. 6 but indicating no recalls open for repair;

FIG. 10 is a user interface display of an electronically displayable file similar to FIG. 7 but indicating no recalls open for repair and no manufacturer buyback;

FIG. 12 is a user interface display of an electronically displayable file showing a detailed history report with a gray market advisory record; and FIG. 13 is a user interface display of an electronically displayable file showing a detailed history report indicating import compliance.

DETAILED DESCRIPTION OF THE PREFERRED EMBODIMENT

Figure 1:
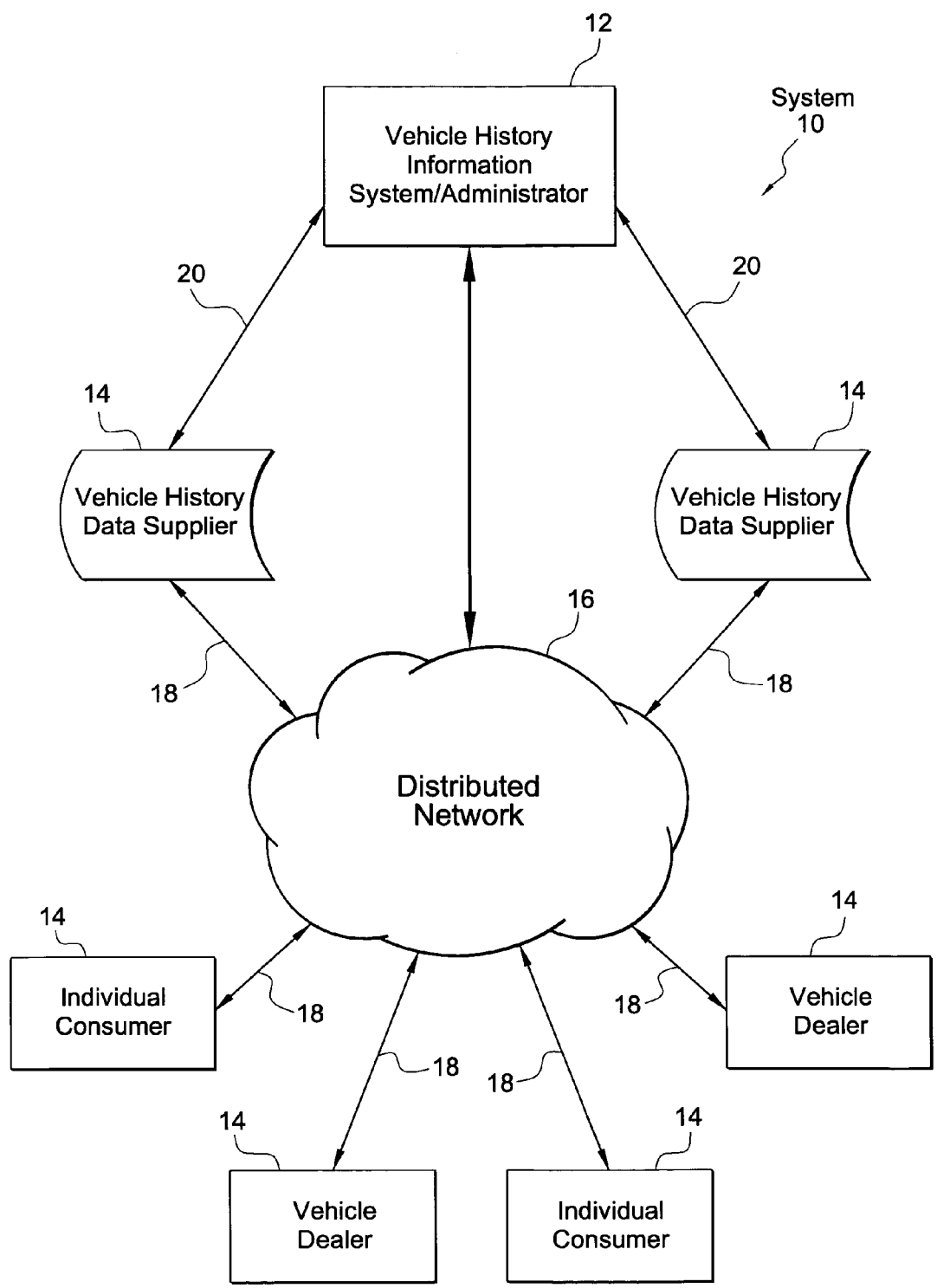
FIG. 1 is a schematic representation of the system of the present invention showing the relationship of different entities using the system.

Referring to the drawings, FIG. 1 is a highly schematic diagram of a system, for example in the form of a computer network 10, designed to implement the subject invention. FIG. 1 may also be viewed as showing the relationship of the different entities potentially involved in the application of one embodiment of the present invention. Specifically, a computer implemented vehicle history information system 12 exchanges data with a plurality of remote terminals 14 through data transmission across a distributed network 16, e.g. Internet. The terminals 14 represent individual consumers and vehicle dealers accessing vehicle history information system 12, as discussed more fully hereinbelow, to obtain vehicle history information about a particular vehicle. Terminals 14 may also include vehicle history data sources or suppliers which are used by the vehicle history information system administrator to create and update vehicle history information in system 12. The vehicle history data suppliers may include individual consumers, vehicle dealers, state titling offices, Department of Motor Vehicles, auto auctions and any other source of vehicle information.

The distributed network 16 may be any type of communications channel such as a local area network (LAN), wide area network (WAN), direct computer connections, and/or wireless connections using radio frequency, infrared, or other wireless technologies using any appropriate communication hardware and protocols, and may further be the Internet. Thus, terminals 14 may be connected to distributed network 16 by any conventional communication links 18, including hardwired and/or wireless. Moreover, the vehicle history data suppliers may provide information to vehicle history system administrator 12 via any means of effectively communicating vehicle history information, including conventional telephone, facsimile and/or mail services indicated at 20.

Figure 2:
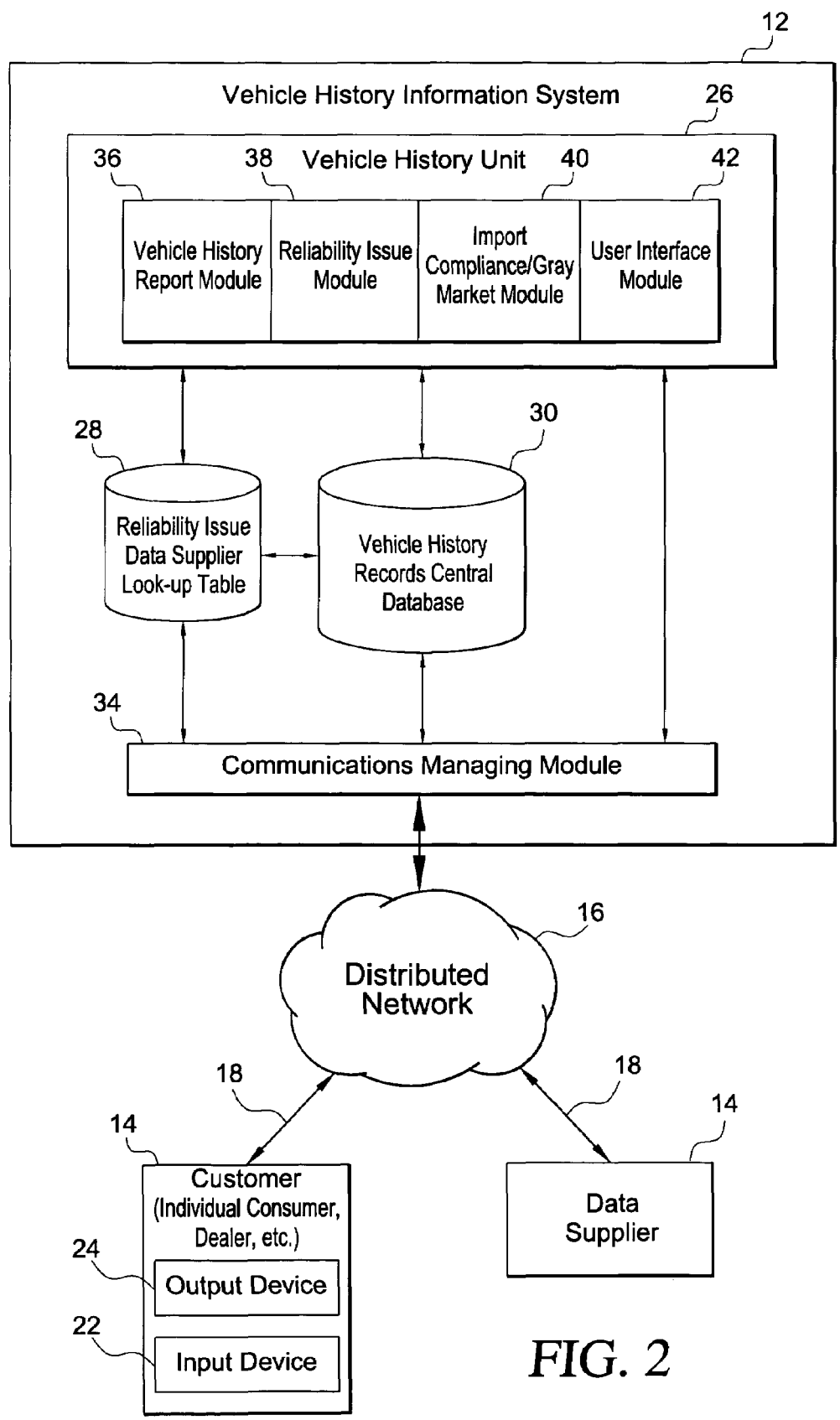
FIG. 2 is a schematic diagram of the computer system of the present invention for determining whether a particular vehicle is subject to an open recall and/or has passed import inspection.

FIG. 2 illustrates in more detail the vehicle history information system 12 in accordance with one embodiment of the present invention. Generally, vehicle history information system 12 may be implemented with any type of appropriate hardware and software, with portions residing in the form of computer readable storage medium having executable instructions, and computer architecture as discussed hereinbelow. Vehicle history information system 12 may be implemented using a server, personal computer, a portable computer, a thin client, etc. or any combination of such devices. In this regard, vehicle history information system 12 may be a single device at a single location as shown, or multiple devices at a single, or multiple, locations that are connected together using any appropriate communication protocols over any communication medium such as electric cable, fiber optic cable, any other cable, or in a wireless manner using radio frequency, infrared, or other technologies.

FIG. 2 also illustrates in more detail the preferred implementation of the terminals 14. Although only one terminal is shown in detail as the customer terminal, which may include the individual consumers and vehicle dealers of FIG. 1, the details of the customer terminal 14 are equally applicable to the data supplier terminal and all other terminals. Terminal 14 may be any appropriate device for accessing vehicle history information system 12 such as a personal computer, portable computer, thin client, a handheld device such as a mobile phone or PDA, and the like. Terminal 14 includes an input device 22 and an output device 24 which allow the user of the terminal 14 to provide information to, and receive information from, vehicle history information system 12 via the distributed network 16. In this regard, the input device 22 may include a keyboard, mouse, etc. as well as data input devices such as memory devices based on magnetic, optical and/or solid state technologies including disc drives, CD/DBD drives, flash memory, etc. The output device 24 may include a monitor screen, printer, etc. that allow the user of the terminal 14 to obtain the vehicle history information from vehicle history information system 12.

Referring to FIG. 2, in the preferred embodiment, vehicle history information system 12 includes a vehicle history unit 26, a recall data supplier look-up table 28, a vehicle history records central database 30, and a communications managing module 34, all of which are connected together for effective data communication. Vehicle history unit 26 specifically includes a vehicle history report module 36, a reliability issue module 38, an import compliance/gray market module 40 and a user interface module 42.

It should be noted that the vehicle history information system 12 and the vehicle history unit 40 in accordance with the embodiment of the present invention is illustrated and discussed herein as having various modules and units which perform particular functions. It should be understood that these modules and units, including the file server and databases, are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the present invention as schematically embodied in FIG. 2 should not be construed to limit the vehicle history information system 12 of the present invention, but be understood to merely be a schematic example.

Vehicle history records central database 30 contains a comprehensive collection of vehicle history data arranged, organized, indexed and/or retrievable based on the unique vehicle identification number (VIN) of a particular vehicle. Each vehicle sold within the United States and most foreign countries has a unique VIN which is identified on nearly every vehicle title issued and physically identified on the respective vehicle. The VIN is the key to identifying and tracing the public record of each vehicle and to associating different vehicle data collected from a variety of sources with the correct particular vehicle. Thus, as used herein, the phrase "particular vehicle" refers to only one physical vehicle associated with a single VIN and does not refer to general model level information or categories of vehicles, for example, relating to a particular make, model and/or year.

As previously mentioned, the administrator of vehicle history information system 12 acquires vehicle history data from a variety of data suppliers 14. Each item of data acquired and entered into central database 30 is associated with a particular VIN and thus a particular vehicle. The vehicle data is added as a record to central database 30 and indexed by the VIN. When a report is requested as discussed hereinbelow, all records indexed by the same VIN are selected.

Central database 30 may be any conventional database capable of effectively storing collections of records in an organized accessible manner to permit efficient easy access to desired pieces of data, i.e. one or more records, for example, associated with a particular VIN, using appropriate database management system software. Preferably, central database 30 receives information from, and may be accessed by, all components of vehicle history information system 12. The information stored in central database 30 may include, for example, the VIN (which indicates make, model and year); accident information, such as salvage title, junk title, flood damage, fire damage, police accident report and damage disclosure information; mileage information, such as odometer problems and actual mileage listings; title and registration events including government registration, taxi registration and commercial registration; stolen vehicle information; fleet information; emissions and safety inspection information; reliability issue information as discussed hereinbelow; and any other information relevant to the vehicle's history.

In the preferred embodiment, a vehicle history unit 26 includes appropriate hardware and software for implementing the various modules and functions necessary to perform the functions of the vehicle history information system described herein. Vehicle history unit 40 may be a general purpose computing device with a central processing unit (CPU) or processor. The software of unit 26 and of the various modules within unit 26 resides in a computer readable storage medium in the form of encoded executable instructions for operating the system and performing the functionalities and process steps described herein.

Vehicle history report module 36 functions to access database 30 and retrieve the appropriate records associated, for example, with a particular VIN upon the request by a user. Thus, module 36 includes the appropriate software necessary to select the appropriate vehicle history records from database 30 based on a particular request, i.e. VIN. The vehicle history report module 36 may further be adapted to arrange and organize the information in a manner appropriate for further data processing and/or display.

User interface module 42 is adapted to utilize the information provided by the vehicle history report module to generate a user interface for delivery to output device 24 of customer terminal 14. User interface module 42 may be in the form of a file server with appropriate software capable of generating particular electronically displayable files for delivery to, and display by, output device 24 of customer terminal 14. Alternatively, the electronically displayable files may be stored in a separate file server within vehicle history information system 12 or may reside on a remote server to which the vehicle history information system 12 is connected. Communications managing module 34 is adapted to manage communications and interactions between vehicle history information system 12 and its various components, and with the various terminals 14 via the distributed network 16.

Importantly, vehicle history unit 26 includes reliability issue module 38 which is adapted to execute particular process steps including analyzing vehicle history data and following specific logic to ultimately form conclusions relative whether a particular vehicle has a reliability issue. As used herein, a reliability issue preferably refers to the issue of whether a particular vehicle has been recalled and the status of any recall, and/or the issue of whether the vehicle has been repurchased by a manufacturer pursuant to Lemon Laws, as a courtesy to a customer or for some other reason, such as resulting from arbitration (hereinafter collectively referred to as a manufacturer buyback). The recall status may include an open recall meaning the vehicle has been recalled yet not repaired based on information supplied to system 12, and no open recall meaning the vehicle has not been recalled or has been recalled yet repaired.

The reliability issue data supplier look-up table 28 of vehicle history information system 12 includes a list of manufacturers supplying reliability issue information to the vehicle history information system administrator for a particular vehicle. Reliability issue module 38 accesses look-up table 28 during processing so as to effectively form conclusions regarding reliability issues as discussed more fully hereinbelow. Look-up table 28 is updated periodically by the vehicle history information system administrator as additional vehicle manufacturers begin to supply reliability issue information for a particular vehicle to the system. Based on the conclusions, user interface module 42 initiates the delivery of an appropriate electronically displayable advisory records or files to terminal 14 for display by output device 24.

Import compliance/gray market module 40 is adapted to execute particular process steps as discussed more fully hereinbelow including analyzing vehicle history data and following specific logic to ultimately form conclusions regarding a vehicle's compliance with import standards. Specifically, import compliance module 40 determines whether a particular vehicle has passed an import inspection based on the information available in the vehicle history record central database 30. Based on these conclusions, user interface module 42 initiates the delivery of appropriate electronically displayable advisory records or files to terminal 14 for display by output device 24.

Figure 3:
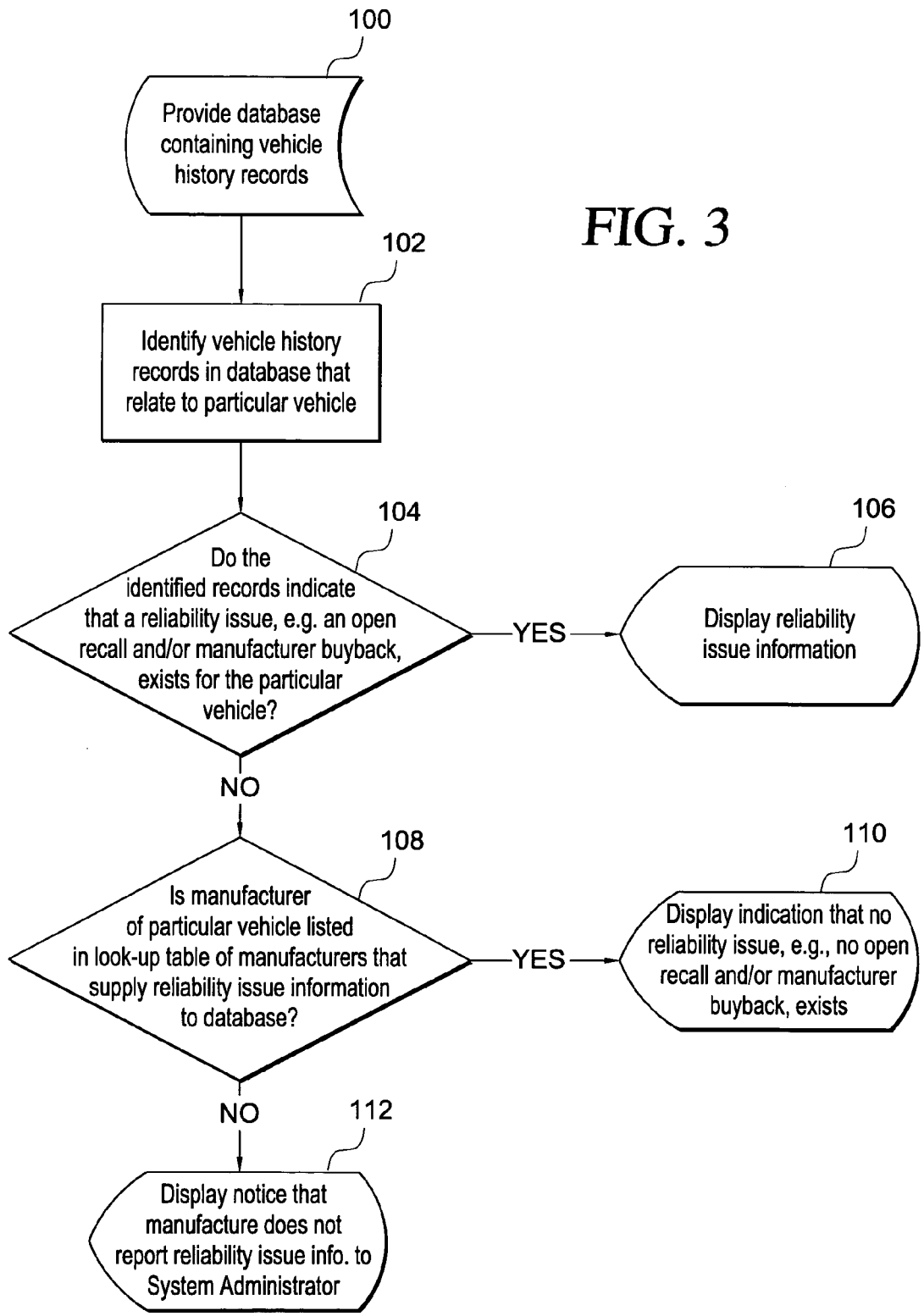
FIG. 3 is flow diagram of the method of the present invention showing the steps for determining whether a particular vehicle is subject to an open recall.

Referring to FIG. 3, a general representation of the preferred method, corresponding to the system of the present invention of FIG. 2, is illustrated in the form of a flow diagram starting with step 100 in which the vehicle history record central database 30, containing vehicle history records, is provided by, for example, the vehicle history information system administrator. Next, in step 102, vehicle history report module 36 identifies vehicle history records in central database 30 that relate to a particular vehicle. Typically, step 102 is performed in response to a customer, i.e.

individual consumer or dealer, providing the VIN of a particular vehicle to vehicle history information system 12. In the preferred embodiment, the customer accesses a website containing electronically displayable files having user interfaces for permitting simple, automated communication between the customer and system 12 via distributed network 16. For example, as shown in FIG. 4, an electronically displayable file including a user interface 101, in the form of an output screen, is displayed on the output device 24 of the customer's terminal 14. The customer then enters the particular vehicle's VIN in an input field 103 and elects a "continue my order" button 105 to submit the VIN to system 12 for processing. The VIN request is received by system 12 via communications managing module 34, which processes the request utilizing vehicle history unit 26. Specifically, vehicle history report module 36 processes the request by selecting all records in central database 30 relating to a particular VIN as represented by step 102 of FIG. 3. The vehicle history report module 36 may also be adapted to sort all vehicle history reports for the particular vehicle by, for example, date.

Next, in step 104, reliability issue module 38 determines whether the identified records relating to a particular vehicle indicates that a reliability issue, i.e., an open recall and/or manufacturer buyback, exists for the particular vehicle. Specifically, a reliability issue exists if a reliability issue record, i.e. open recall record and/or manufacturer buyback record, is found in central database 30 which indicates, for example, that a recall has been issued for the particular vehicle and/or a manufacturer has repurchased the vehicle. Of course, other files may be displayed to the user for inputting contact information and payment information to allow appropriate processing of an order. If a reliability issue record exists for a particular vehicle, then it simply means that the administrator has received reliability issue information from the manufacturer of the particular vehicle regarding the reliability, i.e. recall or manufacturer repurchase or buyback, of the vehicle. Next, in step 106, if a reliability issue record exists, then user interface module 42 initiates the transmission of a reliability issue record or file from system 12, or a file server on the distributed network 16, to customer terminal 14 for display on output device 24. For example, referring to FIG. 5, an electronically displayable file in the form of a user interface showing a report summary may include a portion, i.e. Recall Check, indicated generally at 107, listing the number of open recalls reported. The file of FIG. 5 may also include a portion, i.e. Manufacturer Buyback, indicated generally at 113, indicating a manufacturer buyback. A hyperlink may be provided to additional details on the open recalls in a detailed "Recall Check" section, and/or a "Manufacturer Buyback" section, in the same or another electronically displayable file having a user interface, one example of which is shown in FIG. 6. Specifically, the Recall Check section preferably indicates the date of the recall, the source or manufacturer issuing the recall and a description of the vehicle components subject to recall as indicated at 115. Also, the open recall information and/or manufacturer buyback information may be listed in a user interface presenting a detailed vehicle history report as shown in FIG. 7 at 117 and 119, respectively. The open recall record and/or the manufacturer buyback record are preferably listed chronologically by the respective dates of the recall and manufacturer buyback relative to other records relating to the vehicle, such as ownership transfer records.

Referring again to FIG. 3, if reliability issue module 38 determines that the records associated with the particular vehicle indicate that a reliability issue does not exist for the vehicle, then the process proceeds to step 108 in which reliability issue module 38 determines whether the manufacturer of the particular vehicle is a provider of reliability issue information to system 12. Each of the vehicle manufacturers or component manufacturers supplying reliability issue data to system 12 are listed in the reliability issue data supplier look-up table 28. Reliability issue module 38 accesses look-up table 28 and determines whether the manufacturer is listed in look-up table 28. If the manufacturer is indeed listed in look-up table 28, then the manufacturer necessarily supplies reliability issue information to database 30. In response, in step 110 user interface module 42 initiates a command for the display of an electronically displayable file indicating that no reliability issue exists for the particular vehicle, i.e., no open recall and/or no manufacturer buyback/repurchase. Of course, the electronically displayable files containing various information described in this application may be stored on a file server integral with system 12 or out-sourced to a file hosting service with servers serving the distributed network 16. Therefore, step 110 illustrates the display of the "no open recall" information and/or "no manufacturer buyback". If the manufacturer of the particular vehicle is not listed in look-up table 28, then the process proceeds to step 112 where user interface module 42 initiates a request for displaying information indicating that the manufacturer does not report reliability issues to the system administrator.

The conclusion that no reliability issues exist is inferred from the lack of any recall information from a listed manufacturer regarding a particular vehicle. The manufacturer reliability issue data provided to system 12 only indicates reliability issues of particular vehicles by listing those particular vehicles having reliability issues. Manufacturers do not list vehicles having no recalls and/or no manufacturer buyback. Manufacturers also do not provide any recall data for vehicles having closed recalls, that is, recalls in which the recall repair has been completed. If the manufacturer is indeed providing recall and/or manufacturer buyback information on particular vehicles to the system administrator, and therefore listed in look-up table 28, then the system not only determines that an open recall and/or manufacturer buyback exists for the particular vehicles reported by the manufacturer but also that no open recall and/or manufacturer buyback exists for vehicles not reported by the manufacturer. Also, system 12 receives regular recall data updates from the manufacturers listed in look-up table 28. Once a listed manufacturer becomes aware of the repair of a recalled vehicle having, for example, only one recall, the manufacturer removes the particular vehicle from the list and thus from the next update. Upon receipt of new recall data from a manufacturer, system 12 replaces the previous recall vehicle data with the new recall data so that the recall record for the particular vehicle is removed from the database. Consequently, upon a subsequent VIN based request from a user for information related to the removed vehicle, system 12 will determine that no open recall exists.

Similar to FIG. 5, but as shown in FIG. 8, the "Recall Check" portion of a report summary may indicate that no open recalls are reported as shown generally at 109 while the "Manufacturer Buyback" portion may indicate that no manufacturer buyback was reported by the manufacturer as shown generally at 121. Likewise, the "Recall Check" section as shown in FIG. 9 may indicate the date of the recall check by system 12, the manufacturer of the vehicle or source of the recall, and a description indicating that no recalls are open for repair, as indicated at 111. A similar section may be provided for manufacturer buyback information. FIG. 10 illustrates the user interface display of no open recall information and no manufacturer buyback information in a detailed vehicle history report similar to FIG. 7 which lists chronologically various vehicle history records relating to a particular vehicle including the record with general comments at 114 that there are "no recalls open for repair" and, at 123, that "this vehicle was never repurchased by manufacturer for reliability reasons". It should be noted that, with respect to recall data, the date in the record may be the date of the recall check by the system 12 or the date that the last recall data update was received by the system administrator from the manufacturer. In step 112 of the process of FIG. 3, the display indicating that the manufacturer does not report reliability issue information to the system administrator could also be indicated in the particular portion of the report summary, the detailed section and perhaps as an advisory listed at the end of a detailed vehicle history report.

Figure 11:
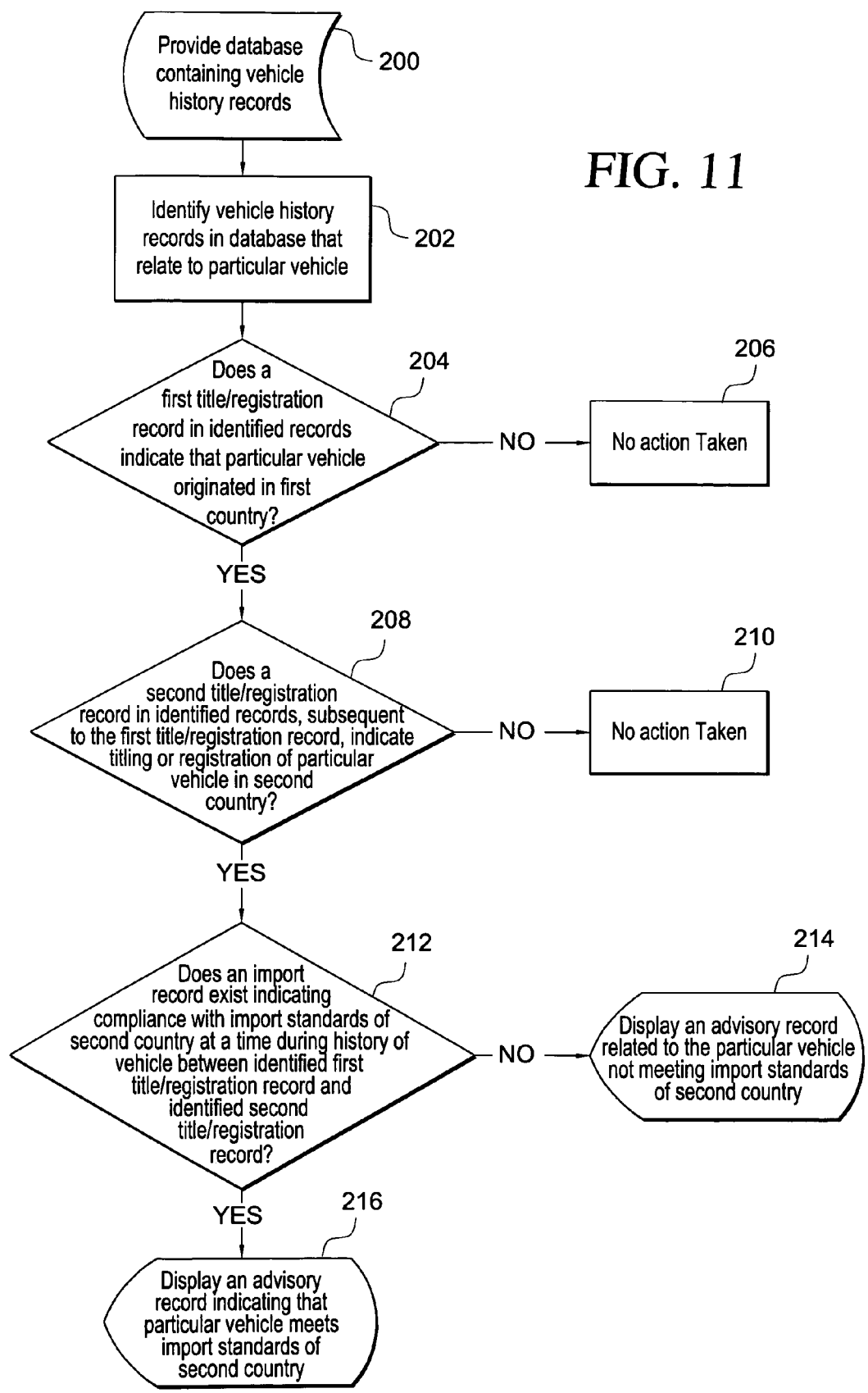
FIG. 11 is a flow diagram of the method of the present invention showing the steps for determining whether a particular vehicle has passed import inspection, that is, complies with import standards.

Now referring to FIG. 11, a general representation of the preferred method of implementing the import compliance/gray market functionality of the system of the present invention is illustrated in the form of a flow diagram starting with step 200 in which vehicle history records central database 30 is provided which contains vehicle history records associated with numerous vehicles. Next, in step 202, vehicle history report module 36 identifies vehicle history records in database 30 that relate to a particular vehicle in response to the receipt of a VIN input from a user as described hereinabove with respect to FIG. 4. Next, in step 204, import compliance/gray market module 40 functions to determine whether a first title/registration record of the identified records indicate that the particular vehicle originated in a first country. If no first title/registration record is found, then no action is taken as indicated in step 206. A title/registration record is defined as a title record indicating a title issuance or title change, and/or a registration record indicating initial vehicle registration or a change in the registered operator. If a first title/registration record indicates the particular vehicle originated in a first country, the process proceeds to step 208 in which import compliance/gray market module 40 determines whether a second title/registration record in the identified records relating to the particular vehicle subsequent to the first title/registration record, indicates titling or registration of the particular vehicle in a second country. If a second title/registration record indicating registration or titling in a second country is not found, then the process proceeds to step 210 where no action is taken. However, if a second title/registration record subsequent to the first title/registration record indicates titling or registration of the particular vehicle in a second country, then the process proceeds to step 212 wherein module 40 determines whether an import record exists indicating compliance with import standards of the second country at a time during the history of the particular vehicle after the identified first title/registration record. Although typically an import record will occur between the first and the second title/registration records, in some instances, slight delays in the import inspection data collection and reporting process cause the import record to be created with a date after the date of the second country's title/registration record but typically in close chronological proximity to the date of the second title/registration record.

It should be noted that an import record is preferably comprised of import compliance information received typically from a particular country's transportation agency, such as the U.S. Dept. of Transportation, or any government agency, or other agency, in charge of vehicle safety and emissions standards compliance. The import record typically lists the vehicle VIN, make, model, the date the vehicle entered the country and the date the vehicle was inspected and met the second country's compliance standards. Of course, the first country and the second country may be any two countries wherein a vehicle may originate in one country and be imported into the second country. For example, it is not uncommon for vehicles originating in Canada, or another country other than the U.S., to enter into the U.S. via Canada and perhaps not meet U.S. import compliance standards relative to safety, emissions and odometer specifications. Of course, for purposes of the present invention, an import record may include any information from a reliable source indicating compliance with import standards and preferably an official report from a government agency of the second country.

If the system determines in step 212 that no import record, indicating compliance with the import standards of the second country, exists, then the process proceeds to step 214 in FIG. 11 wherein a user interface containing an advisory record is displayed which indicates that the particular vehicle may not meet the import standards of the second country. Of course, the display may indicate that the vehicle is a gray market vehicle which is understood to mean that the vehicle was illegally imported into the second country without proper inspections by the appropriate authorities. Thus in step 214, for example, user interface module 42 initiates a request for an electronically displayable file having a user interface to be delivered from system 12 or an independent file server, to the customer's terminal 14 for display on output device 24. For example, FIG. 12 represents a user interface in the form of a detailed vehicle history report containing various records listed chronologically and relating to a particular vehicle. The advisory record, indicated generally at 215, is a gray market vehicle alert suggesting that the vehicle may not have been properly imported. The alert also notifies the user that the vehicle may not comply with the second country, i.e. U.S., safety and emissions standards, the odometer may not reflect accurate mileage after being converted to miles, and the manufacturer warranty may be invalid.

If, however, the system determines in step 212 that an import record does exist which indicates compliance with import standards of the second country at a time after the first title/registration records previously identified for the particular vehicle, then the process moves to step 216 wherein an advisory record is displayed indicating that the particular vehicle meets the import standards of the second country. Specifically, user interface module 42 initiates the delivery of an electronically displayable file, having a user interface, to customer terminal 14. For example, FIG. 13 illustrates a user interface similar to FIG. 12 but wherein the import advisory notifies the user that the vehicle was inspected and complies with the second country's import standards, i.e. U.S. highway safety standards, as indicated at 217.

Thus, the present invention permits a user to easily and simply obtain valuable, accurate and reliable information regarding the existence or nonexistence of open recalls and manufacturer buybacks, and/or the import compliance of a particular imported vehicle. Through the determination and display of critical recall, buyback and import compliance information, the present system and method presents a more accurate and informative report of a vehicle's history along with important advisory information relating to recalls, buybacks and imported vehicles.

I claim:

1. A method for generating and displaying information relating to a vehicle's history, comprising the steps of:
   receiving a user request for information that relate to a particular vehicle;
   identifying records in a database that relate to the particular vehicle, said records containing data relating to the vehicle's history, said database having records of vehicles manufactured by a plurality of manufacturers;
   determining whether said records include a reliability issue record containing information indicating that a reliability issue exists for the particular vehicle;
   if a reliability issue record exists for the particular vehicle, then displaying an electronically displayable reliability issue file;
   if no reliability issue record exists, then determining whether said database should contain reliability issue information regarding the particular vehicle; and
   if said database should include reliability issue information regarding the particular vehicle, displaying an electronically displayable file related to the absence of a reliability issue for the particular vehicle.

2. The method of claim 1, wherein said step of determining whether said database should contain reliability issue information includes determining whether a manufacturer of the vehicle provides data for inclusion in said database.

3. The method of claim 2, wherein said step of determining whether the manufacturer of the vehicle provides data for inclusion in said database includes accessing a look-up table listing vehicle manufacturers providing data for inclusion in said database and determining whether the manufacturer of the vehicle is listed in the look-up table.

4. The method of claim 1, wherein the file related to the absence of a reliability issue includes a no open recall file which indicates that no recalls are open for repair.

5. The method of claim 1, wherein the open recall file includes a name of the manufacturer of the particular vehicle and a description of vehicle components recalled.

6. The method of claim 1, further including the steps of providing an electronically displayable file having an input field for receiving a vehicle identification number associated with the particular vehicle, said step of identifying records being based on the particular vehicle identification number.

7. The method of claim 6, wherein said reliability issue file is displayed chronologically based on an effective date of the recall in a chronological listing of vehicle history records associated with the particular vehicle.

8. The method of claim 1, wherein said reliability issue record is at least one of an open recall record and a manufacturer buyback record, said file related to the absence of a reliability issue being at least one of a no open recall file related to the absence of an open recall and a no manufacturer buyback file related to the absence of a manufacturer buyback.

9. A method for generating and displaying information relating to a vehicle's history, comprising the steps of:
   identifying records in a database that relate to a particular vehicle, said records containing data relating to the vehicle's history;
   determining whether said records include a reliability issue record containing information indicating that a reliability issue exists for the particular vehicle;
   if a reliability issue record exists for the particular vehicle, then displaying an electronically displayable reliability issue file;
   if no reliability issue record exists, then determining whether said database should contain reliability issue information regarding the particular vehicle; if said database should include reliability issue information regarding the particular vehicle, displaying an electronically displayable file related to the absence of a reliability issue for the particular vehicle;
   determining whether a first title/registration record of the records relating to the particular vehicle indicate the vehicle originated in a first country;
   determining whether a second title/registration record, subsequent to said first title/registration record during the vehicle's history, indicates at least one of a titling and a registration in a second country;
   determining whether an import record exists that indicates compliance with import standards of said second country at a time during the history of the vehicle after said first title/registration record; and
   if no import record relating to said second country exists after said first and said second title/registration records, then displaying an electronically displayable first import advisory file related to the vehicle not meeting import standards of said second country.

10. The method of claim 9, further including the step of displaying an electronically displayable second import advisory record indicating the vehicle meets import standards of said second country, if an import record relating to said second country exists after said first title/registration record.

11. A computer implemented system for generating and displaying information relating to a vehicle's history, comprising:
    a user interface adapted to receive a user request for information that relate to a particular vehicle;
    vehicle history report module adapted to identify records in a database that relate to the particular vehicle, said database having records of vehicles manufactured by a plurality of manufacturers, and said records containing data relating to the vehicle's history; and
    reliability issue module adapted to determine whether said records include a reliability issue record containing information indicating that a reliability issue exists for the particular vehicle, display an electronically displayable reliability issue file if a reliability issue record exists, determine whether said database should contain reliability issue information regarding the particular vehicle if no reliability issue record exists, and, if said database should include reliability issue information, to display an electronically displayable file related to the absence of a reliability issue for the particular vehicle.

12. The system of claim 11, wherein said reliability issue module is adapted to determine whether a manufacturer of the vehicle provides data for inclusion in said database.

13. The system of claim 12, wherein said reliability issue module is adapted to determine whether the manufacturer of the vehicle provides data for inclusion in said database by accessing a look-up table listing vehicle manufacturers providing data for inclusion in said database and determining whether the manufacturer of the vehicle is listed in the look-up table.

14. The system of claim 11, wherein said vehicle history report module is adapted to provide an electronically displayable file having an input field for receiving a vehicle identification number associated with the particular vehicle and to identify records based on the particular vehicle identification number.

15. The system of claim 11, wherein said reliability issue record is at least one of an open recall record and a manufacturer buyback record, said file related to the absence of a reliability issue being at least one of a no open recall file related to the absence of an open recall and a no manufacturer buyback file related to the absence of a manufacturer buyback.

16. A computer implemented system for generating and displaying information relating to a vehicle's history, comprising:
   vehicle history report module adapted to identify records in a database that relate to a particular vehicle, said records containing data relating to the vehicle's history; and
   reliability issue module adapted to determine whether said records include a reliability issue record containing information indicating that a reliability issue exists for the particular vehicle, display an electronically displayable reliability issue file if a reliability issue record exists, determine whether said database should contain reliability issue information regarding the particular vehicle if no reliability issue record exists, and, if said database should include reliability issue information, to display an electronically displayable file related to the absence of a reliability issue for the particular vehicle;
   an import compliance module adapted to:
      determine whether a first title/registration record of the records relating to the particular vehicle indicate the vehicle originated in a first country;
      determine whether a second title/registration record, subsequent to said first title/registration record during the vehicle's history, indicates at least one of a titling and a registration in a second country;
      determine whether an import record exists that indicates compliance with import standards of said second country at a time during the history of the vehicle after said first title/registration record, and
      if no import record relating to said second country exists after said first title/registration record, display an electronically displayable first import advisory file related to the vehicle not meeting import standards of said second country.

17. A computer readable medium having instructions for generating and displaying information relating to a vehicle's history, said medium comprising:
   instructions for receiving a user request for information that relate to a particular vehicle;
   instructions for identifying records in a database that relate to the particular vehicle, said database having records of vehicles manufactured by a plurality of manufacturers, and said records containing data relating to the particular vehicle's history;
   instructions for determining whether said records include a reliability issue record containing information indicating that a reliability issue exists for the particular vehicle;
   instructions for displaying an electronically displayable reliability issue file if a reliability issue record exists;
   instructions for determining whether said database should contain reliability issue information regarding the particular vehicle if no reliability issue record exists and for displaying an electronically displayable file related to the absence of a reliability issue for the particular vehicle if said database should include reliability issue information.

18. The medium of claim 17, wherein said instructions for determining whether said database should contain reliability issue information includes instructions for determining whether a manufacturer of the vehicle provides data for inclusion in said database.

19. The medium of claim 18, wherein said instructions for determining whether the manufacturer of the vehicle provides data for inclusion in said database includes instructions for accessing a look-up table listing vehicle manufacturers providing data for inclusion in said database and determining whether the manufacturer of the vehicle is listed in the look-up table.

20. The medium of claim 17, further including instructions for providing an electronically displayable file having an input field for receiving a vehicle identification number associated with the particular vehicle, wherein said identified records are based on the particular vehicle identification number.

21. A computer readable medium having instructions for generating and displaying information relating to a vehicle's history, said medium comprising:
   instructions for identifying records in a database that relate to a particular vehicle, said records containing data relating to the particular vehicle's history;
   instructions for determining whether said records include a reliability issue record containing information indicating that a reliability issue exists for the particular vehicle;
   instructions for displaying an electronically displayable reliability issue file if a reliability issue record exists;
   instructions for determining whether said database should contain reliability issue information regarding the particular vehicle if no reliability issue record exists and for displaying an electronically displayable file related to the absence of a reliability issue for the particular vehicle if said database should include reliability issue information;
   instructions for identifying records in a database that relate to a particular vehicle, said records containing data relating to the particular vehicle's history;
   instructions for determining whether a first title/registration record of the records relating to the particular vehicle indicate the vehicle originated in a first country;
   instructions for determining whether a second title/registration record, subsequent to said first title/registration record during the vehicle's history, indicates at least one of a titling and a registration in a second country;
   instructions for determining whether an import record exists that indicates compliance with import standards of said second country at a time during the history of the vehicle after said first title/registration record; and
   instructions for displaying an electronically displayable first import advisory file related to the vehicle not meeting import standards of said second country if no import record relating to said second country exists after said first title/registration record.

22. A method for generating and displaying import compliance information relating to a vehicle's history, comprising the steps of:
   identifying records in a database that relate to a particular vehicle, said records containing data relating to the vehicle's history;
   determining whether a first title/registration record of the records relating to the particular vehicle indicate the vehicle originated in a first country;
   determining whether a second title/registration record, subsequent to said first title/registration record during the vehicle's history, indicates at least one of a titling and a registration in a second country;
   determining whether an import record exists that indicates compliance with import standards of said second country at a time during the history of the vehicle after said first title/registration record;

if no import record relating to said second country exists after said first title/registration record, then displaying an electronically displayable first import advisory file related to the vehicle not meeting import standards of said second country.

23. The method of claim 22, wherein said first import advisory file further indicates that the vehicle may not be covered by a manufacturer's warranty.

24. The method of claim 22, further including the step of displaying an electronically displayable second import advisory record indicating the vehicle meets import standards of said second country, if an import record relating to said second country exists after said first title/registration record.

25. The method of claim 22, wherein said first import advisory file is displayed in a chronological listing of vehicle history records for the particular vehicle.

26. The method of claim 25, wherein said first import advisory file is displayed chronologically immediately subsequent to said second title/registration records.

27. The method of claim 22, further including the steps of providing an electronically displayable file having an input field for receiving a vehicle identification number associated with the particular vehicle, said step of identifying records being based on the particular vehicle identification number.

28. A system for generating and displaying import compliance information relating to a vehicle's history, comprising:

vehicle history report module adapted to identify records in a database that relate to a particular vehicle, said records containing data relating to the vehicle's history;

import compliance module adapted to determine whether a first title/registration record of the records relating to the particular vehicle indicate the vehicle originated in a first country;

determine whether a second title/registration record, subsequent to said first title/registration record during the vehicle's history, indicates at least one of a titling and a registration in a second country;

determine whether an import record exists that indicates compliance with import standards of said second country at a time during the history of the vehicle after said first title/registration record, and if no import record relating to said second country exists after said first title/registration record, display an electronically displayable first import advisory file related to the vehicle not meeting import standards of said second country.

29. The system of claim 28, wherein said first import advisory file further indicates that the vehicle may not be covered by a manufacturer's warranty.

30. The system of claim 28, wherein said import compliance module is adapted to display an electronically displayable second import advisory record indicating the vehicle meets import standards of said second country, if an import record relating to said second country exists after said first title/registration record.

31. The system of claim 28, wherein said first import advisory file is displayed in a chronological listing of vehicle history records for the particular vehicle.

32. The system of claim 31, wherein said first import advisory file is displayed chronologically immediately subsequent to said second title/registration records.

33. The system of claim 28, wherein said vehicle history report module is adapted to provide an electronically displayable file having an input field for receiving a vehicle identification number associated with the particular vehicle and to identify records based on the particular vehicle identification number.

34. A computer readable storage medium having instructions for generating and displaying import compliance information relating to a vehicle's history, said medium comprising:

instructions for identifying records in a database that relate to a particular vehicle, said records containing data relating to the vehicle's history;

instructions for determining whether a first title/registration record of the records relating to the particular vehicle indicate the vehicle originated in a first country;

instructions for determining whether a second title/registration record, subsequent to said first title/registration record during the vehicle's history, indicates at least one of a titling and a registration in a second country;

instructions for determining whether an import record exists that indicates compliance with import standards of said second country at a time during the history of the vehicle after said first title/registration record;

instructions for displaying an electronically displayable first import advisory file related to the vehicle not meeting import standards of said second country if no import record relating to said second country exists after said first title/registration record.

35. The medium of claim 34, wherein said first import advisory file further indicates that the vehicle may not be covered by a manufacturer's warranty.

36. The medium of claim 34, further including the step of displaying an electronically displayable second import advisory record indicating the vehicle meets import standards of said second country, if an import record relating to said second country exists after said first title/registration record.

37. The medium of claim 34, wherein said first import advisory file is displayed in a chronological listing of vehicle history records for the particular vehicle, chronologically immediately subsequent to said second title/registration records.

38. The medium of claim 34, further including instructions for providing an electronically displayable file having an input field for receiving a vehicle identification number associated with the particular vehicle, wherein said identified records are based on the particular vehicle identification number.

* * * * *